(12) United States Patent
Tatum et al.

(10) Patent No.: US 8,115,929 B2
(45) Date of Patent: Feb. 14, 2012

(54) THREAD LATERAL MOVEMENT SENSOR

(75) Inventors: Jimmy A. Tatum, Plano, TX (US);
James K. Guenter, Garland, TX (US);
Andre Lalonde, Allen, TX (US)

(73) Assignee: Finisar Corporation, Sunnyvale, CA (US)

( * ) Notice: Subject to any disclaimer, the term of this patent is extended or adjusted under 35 U.S.C. 154(b) by 510 days.

(21) Appl. No.: 12/323,679

(22) Filed: Nov. 26, 2008

(65) Prior Publication Data

US 2009/0141277 A1 Jun. 4, 2009

Related U.S. Application Data

(60) Provisional application No. 60/991,056, filed on Nov. 29, 2007, provisional application No. 61/022,576, filed on Jan. 22, 2008.

(51) Int. Cl.
*G01N 21/84* (2006.01)

(52) U.S. Cl. .................................... 356/429; 356/430

(58) Field of Classification Search .......... 356/429–431, 356/454, 480, 519; 250/559.45, 559.04, 250/559.41; 73/160, 159
See application file for complete search history.

(56) References Cited

U.S. PATENT DOCUMENTS 5,424,557 A * 6/1995 Rydborn .................. 250/559.01
2005/0236589 A1* 10/2005 Brunfeld et al. ......... 250/559.11

* cited by examiner

*Primary Examiner* — Gregory J Toatley
*Assistant Examiner* — Tri T Ton
(74) *Attorney, Agent, or Firm* — Maschoff Gilmore & Israelsen

(57) ABSTRACT

A system for detecting the lateral movement of thread includes an optical device configured to emit an optical signal. The optical device includes a resonant cavity. The system further includes a driver configured to drive the optical signal. A mechanical guide is configured to receive a moving thread that scatters the optical signal such that a portion of the optical signal is reflected back into the resonant cavity of the optical device; causing a change in the optical signal. An optical detector is configured to detect the changed optical signal. Lateral movement detection circuitry is configured to detect lateral movements such as vibrations.

13 Claims, 1 Drawing Sheet

THREAD LATERAL MOVEMENT SENSOR

CROSS-REFERENCE TO RELATED APPLICATIONS

This application claims the benefit of U.S. Provisional Patent Application Ser. No. 60/991,056, entitled THREAD SPEED AND BREAK SENSOR, filed Nov. 29, 2007 and U.S. Provisional Patent Application Ser. No. 61/022,576, entitled THREAD LATERAL MOVEMENT SENSOR, filed Jan. 22, 2008, both of which are incorporated herein in their entirety by this reference.

BACKGROUND

1. The Field of the Invention

In the textile industry, there is often a need to detect thread speeds, vibration, and breaks in threads. Illustratively, a weaving or knitting machine for manufacturing cloth may include provisions for unwinding thread from a spool and integrating the thread into manufactured cloth. As part of this process, it may be advantageous to know the speed at which the thread is being unspooled in the cloth making process and vibration to warn of impending issues. Additionally, if the thread breaks, it is desirable to be aware of this occurrence so that appropriate correction can be enacted to continue the cloth making process.

2. The Relevant Technology

Thread speed sensors typically use a mechanical wheel, where the wheel has one or more voids in the wheel to allow an optical signal to be transmitted from one side of the mechanical wheel and received at a sensor on the opposite side of the mechanical wheel. This allows rotations or partial rotations to be counted, and thread speed to be calculated based on the size of the mechanical wheel and number of rotations of the mechanical wheel. This does not however account for variations in elasticity of the thread which can introduce some error in the measurement.

Thread break sensors are separate components from the thread speed sensors. Thread break sensors typically use either optical signals to sense the presence of a thread or ceramic rings that can be used to detect a change in capacitance caused by the introduction or removal of a thread. Thus, to detect both the speed and continuity of the thread, two different sets of components are implemented.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method of measuring the lateral movement or sway of thread in a textile manufacturing system. The method includes emitting an optical signal from an optical device. The optical device includes a resonant cavity. At least a portion of the optical signal is scattered by a moving thread. At least a portion of the scattered optical signal is received back into the resonant cavity of the optical device, which causes a change in the optical signal emitted from the optical device. The changed optical signal is detected at a photodiode optically coupled to the optical device. A lateral movement of the thread is calculated based on the detected change in optical signal.

In another embodiment, a system for detecting the lateral movement of thread in a textile manufacturing system is disclosed. The system includes an optical device configured to emit an optical signal. The optical device includes a resonant cavity. The system further includes a driver connected to the optical device. The driver is configured to drive the optical signal. A mechanical guide is connected to the optical device. The mechanical guide is configured to receive a moving thread in a textile manufacturing process. The moving thread scatters the optical signal such that a portion of the optical signal is reflected back into the resonant cavity of the optical device causing a change in the optical signal. An optical detector is optically coupled to the optical device. The optical detector is configured to detect the changed optical signal. Lateral movement detection circuitry is connected to the optical detector. The lateral movement detection circuitry is configured to output a signal representing the lateral movement of the moving thread based on the detected changed optical signal.

This Summary is provided to introduce a selection of concepts in a simplified form that are further described below in the Detailed Description. This Summary is not necessarily intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Figure 1:
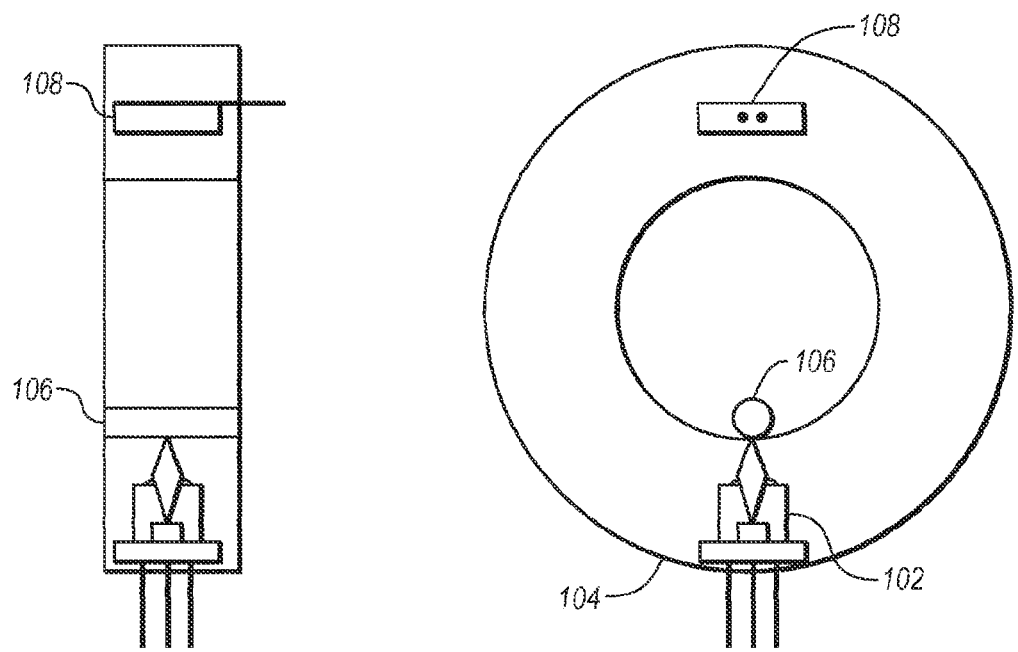
FIG. 1 illustrates a mechanical drawing of an optical thread speed, lateral movement and break sensor.

Some embodiments described herein are directed to measurement of the speed and vibration of a thread such as yarn or other thread in a weaving machine, knitting machine, or other textile manufacturing machine. The embodiment may also be applied to wire winding or dispensing machines in the electronics industry. Embodiments may also include a break sensor which could be integrated on a single side of a mechanical guide. Still further, embodiments may include sensors for detecting lateral movement of a thread with respect to the mechanical guide in a textile manufacturing machine.

One embodiment uses a vertical cavity surface emitting laser (VCSEL) with integrated photodiode (VIP) with the VCSEL in a self mixing mode to measure the speed and/or lateral movement of a thread through a mechanical guide ring. Alternatively, in place of a VCSEL, a resonant cavity light emitting diode (RCLED) may be used. An example of a VIP is illustrated in U.S. Pat. No. 7,184,454 titled "Light Emitting Device With An Integrated Monitor Photodiode" issued on Feb. 27, 2007, which is incorporated herein by reference. This patent describes a monolithically formed laser and photodiode. The monolithically formed laser and photodiode includes a Vertical Cavity Surface Emitting Laser (VCSEL) that includes a first PN junction. The first PN junction includes a first p layer and a first n layer. A tunnel diode is connected to the VCSEL both physically and electronically through a wafer fabrication process. A photodiode is connected to the tunnel diode. The photodiode is connected to the tunnel diode by physical and electronic connections. The tunnel diode and photodiode may share some common layers. The tunnel diode includes a second PN junction. The monolithically formed laser and photodiode allow for an integrated structure with diode biasing flexibility including the use of a single supply to bias both the laser and photodiodes.

One advantage of the self mixing methodology is that it is non contact, very compact, can reuse components for the speed sensor, lateral movement sensor and break sensor, and can have a very wide dynamic range of speed. Illustratively, the sensor may also include a photodiode opposite the VIP structure to act as a break detector. The advantage of the additional PD is that the sensor can operate with a wider range of threads, and can potentially learn the properties of different threads.

Self mixing applications make use of laser power reflected back into the laser cavity and more especially into the active region. This reflected laser power changes the output of the laser. The output of the laser may be changed such as by changing the wavelength of the laser, by causing the laser output to be modulated in various beat patterns, and/or changing the amplitude of the laser output. A change in the wavelength of the laser, however, may be almost undetectably small. Thus the change in the wavelength may be detected as a shift in phase of an optical signal.

By continuously monitoring output from the laser, information can be gathered about conditions external to the laser. For example, using appropriate modulation and digital signal processing, information can be gathered about the distance of objects from a laser, movement of objects about the laser and the like. This allows the laser to be used in applications such as linear and/or later measurements. Methods of using lasers in self mixing applications are described in more detail in U.S. Pat. No. 6,707,027 titled "Method Of Measuring The Movement Of An Input Device" issued to Liess, et al. on Mar. 16, 2004, which is incorporated herein by reference in its entirety.

Self mixing applications make use of a laser's sensitivities to temperature and reflected light to achieve the self mixing functionality. For example, by varying the temperature of the laser, the frequency of the laser light that is output by the laser can be varied. Thus, temperature variations can be used to create a wavelength chirp, i.e., a controlled increase and decrease in frequency, which can be used in a Doppler Effect range and motion sensor. When portions of a chirped signal are reflected back into the laser active region, the laser changes its output characteristics. These output characteristics can be detected to determine various actions that are occurring outside the laser as described above. An integrated photodiode is therefore useful for monitoring laser output power in self mixing applications where a Doppler effect causes a change in the output of the laser.

In some embodiments, a VIP structure is fabricated to optimize or enhance the effects of reflections, temperature changes and the like. Additionally, changes in the thermal and/or electrical characteristics of a structure can be useful for allowing the laser wavelength to be modulated by a bias current applied to the laser.

In some embodiments of the invention, a structure is fabricated to optimize or enhance the effects of reflections, temperature changes and the like. This can be accomplished by optimizing optical characteristics such as by allowing more light to be reflected from outside the laser into the active region. Other optimizations contemplate optimizing the laser to be effected by temperature changes such as by changing the thermal conductivity/resistance or thermal mass characteristics of the laser. Still other optimizations alter the threshold current versus temperature operating characteristics to change the characteristics of the laser by optimizing the line width enhancement factor.

In some embodiments, the laser does not necessarily need to be modulated. In particular, if only speed measurements are needed without an indication of direction, then embodiments may be implemented where the laser is not modulated, simply operating at a designated forward current.

Referring now to FIG. 1, one example embodiment is illustrated. In the example illustrated in FIG. 1, a VIP 102 is mounted into a ceramic molded ring 104. The molded ceramic ring acts as a mechanical guide for guiding thread 106 in proximity to the VIP 102. The VIP 102 is coupled to driving and detecting circuitry, causing the VIP 102 to emit an optical signal and allowing for monitoring the VIP 102 output.

As thread 106 is passed through the mechanical guide, where the thread may be any appropriate fiber including but not limited to spun textiles, yarn, drawn fibers, bundled cables, etc., the optical output from the VIP 102 is scattered by the thread 106. Portions of the scattered optical output are reflected back into the resonant cavity of the VCSEL portion of the VIP 102. This causes a change in the output of the VCSEL which can be detected by the detecting circuitry. The change can be used to calculate the lateral movement and speed of the thread 106.

In particular, the movement of the thread imparts a power instability to the VCSEL portion of the VIP 102 because of the varying intensity and phase of reflected light coupled back into the resonant cavity. The noise instability can be measured directly through a photodiode portion of the VIP 102 optically coupled to the VCSEL source portion of the VIP 102. A DC signal from the photodiode portion of the VIP 102 is removed by an AC coupling capacitor. The AC signal from the photodiode signal is amplified. The signal is then processed through a fast Fourier transform (FFT) algorithm, as will be explained in more detail in conjunction with the discussion of FIG. 2 below, to convert the time varying noise signal to a frequency spectrum. The frequency spectrum can then be used as a direct measurement of the speed of the thread.

To detect lateral movement, an amplitude measurement of the output of the VCSEL can be taken which provides an indication of the amount of lateral movement with respect to a mechanical guide and/or vibration of a thread.

Notably, some embodiments may further include a photodiode 108 used in detecting breaks in the thread 106. The additional photodiode 108 allows the sensor to operate with a wider range of threads. Additionally, the photodiode 108 may be used to learn the properties of different threads. For example, the amount of light reaching the photodiode 108 from the VCSEL source of the VIP 102 will depend on the transparency of the thread 106 to the wavelength of the VCSEL. The transparency may be affected by, for example, the thickness of the thread, the density of the thread, etc. When there is a measurable speed signal on the circuit, the amount of power measured in the additional photodiode 108 can be set as a threshold, or the nominal operating point of the detector. Small variations from this signal level will not trigger false break detection. This lowers the required dynamic range of the sensor when a wide variety of threads are used in the system.

Notably, the additional photodiode 108 can also be used in the lateral movement detection. For example, when lateral movement is occurring for a thread, the thread may behave with respect to the additional photodiode 108 as a more transparent thread. Measurements at the additional photodiode 108 may be used along with measurements of the VCSEL output as a result of self mixing to determine that vibrations are occurring, and the degree to which they are occurring.

Figure 2:
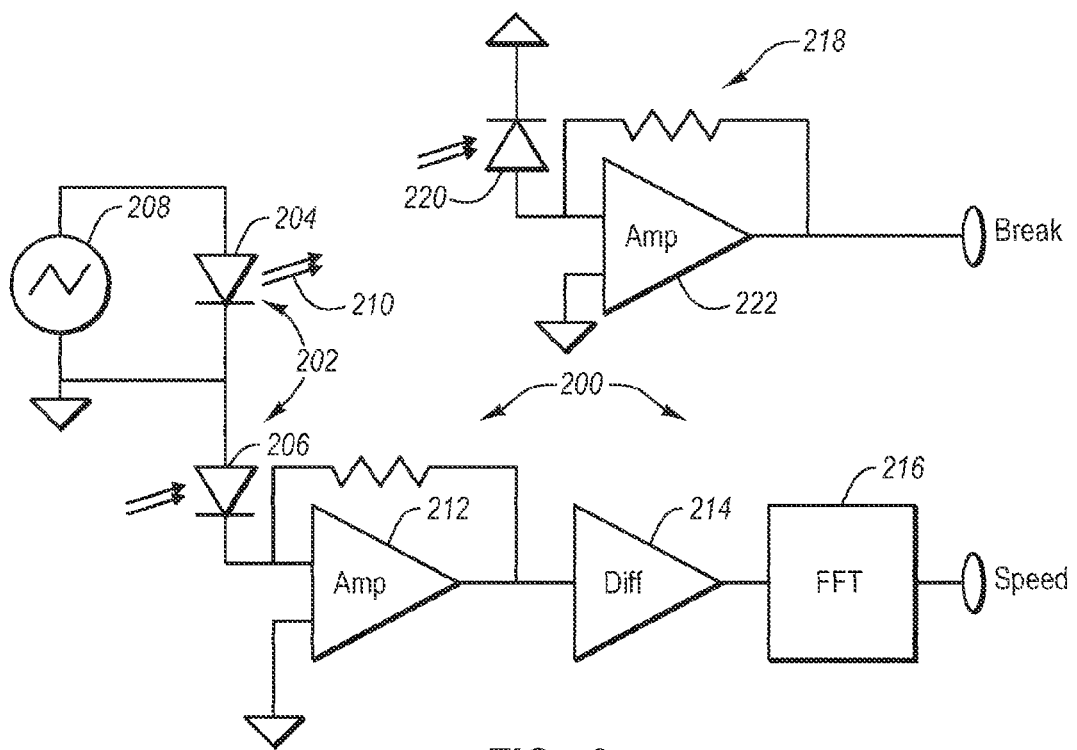
FIG. 2 illustrates a schematic diagram of an optical speed, lateral movement and break sensor.

Referring now to FIG. 2, a schematic diagram illustrating circuitry and components is illustrated. FIG. 2 illustrates a speed and lateral movement sensor 200. The speed and lateral movement sensor 200 is fabricated using a VIP 202. The VIP 202 includes a resonant cavity light emitting device 204. As mentioned previously, the resonant cavity light emitting device may be for example a VCSEL or a resonant cavity LED. In an alternate embodiment, the light emitting device may be a Fabry Perot laser. The VIP also includes a photodiode 206 which may be manufactured in the same monolithic structure as the resonant cavity light emitting device 204. The resonant cavity light emitting device 204 is connected to the driver 208 which includes circuitry for driving the resonant cavity light emitting device 204 to produce an optical signal illustrated at 210. The driver 208 may be configured to deliver a constant direct current signal to the resonant cavity light emitting device 204 when only speed measurements without a directional component are required. In an alternative embodiment, the driver 208 may be configured to deliver an alternating current signal. In one embodiment the alternating current signal may be for example a chirp for Doppler speed and direction measurements.

Additionally, embodiments may be implemented to detect vibrations. Vibrations generally have a periodic nature, such as one might expect by plucking the thread and having a resulting standing wave on the thread. Vibrations of the thread cause an up and down or side to side movement with respect to resonant cavity light emitting device 204. This movement can be detected in a fashion similar to measuring the speed of the thread as described previously. As such, a self mixed waveform from a VIP or adjacent detector such as the photodiode 206 would have a frequency component corresponding to the vibration. An FFT of this waveform can be taken to determine the threads vibration frequency. This may be useful to measure if there may be an issue with the textile manufacturing equipment. The frequency of vibration and speed of movement have an extremely small probability of being exactly the same so one may be able to detect both simultaneously when looking at the peaks on the FFT magnitude spectrum. One peak would be a result of thread velocity; the other would be the component of thread vibration.

FIG. 2 further illustrates that the photodiode 206 is connected to a post amplifier 212. The post amplifier 212 amplifies the small electrical signal produced by the photodiode 206. The post amplifier 212 is connected to a differential amplifier 214. The differential amplifier 214 may be used to detect differences between the anticipated output of the resonant cavity light emitting device 204 absent any reflection of the optical signal 210 back into the resonant cavity light emitting device 204 and the optical signal 210 produced by the resonant cavity light emitting device 204 when portions of the optical signal 210 are reflected back into the resonant cavity light emitting device 204. The output of the differential amplifier 214 is provided to analyzing circuitry such as the fast Fourier transform circuit 216. The analyzing circuitry 216 outputs a signal that can be correlated to speed of a thread.

As explained previously, a thread moving past, and/or moving with respect to the resonant cavity light emitting device 204 causes reflections of the optical signal 210 back into the resonant cavity light emitting device 204 dependent on the speed of the thread past and/or movement of the thread with respect to the resonant cavity light emitting device 204. These reflections cause the resonant cavity light emitting device 204 to output a changed optical output 210 which is then detected by the photodiode 206. The circuitry previously described is then used to generate a signal that can be used to determine the speed and vibration of the thread passing by the resonant cavity light emitting device 204 and/or movement of the thread with respect to the light emitting device 204.

FIG. 2 further illustrates a break detector 218 which reuses portions of the speed sensor 200. In particular, the optical signals 210 from the resonant cavity light emitting device 204 can be detected by a discreet photodiode 220 where the discrete photodiode 220 is disposed in a fashion such that a thread passes between the resonant cavity light emitting device 204 and the photodiode 220. When a thread is present between the resonant cavity light emitting device 204 and the photodiode 220, lower amounts of the optical signal 210 will reach the photodiode 220. If a thread breaks, then higher amounts of the optical signal 210 will reach the discrete photodiode 220. Alternatively, if a thread begins to vibrate, marginally higher amounts of the optical signal 210 will reach the photodiode 220 dependent upon the amount of vibration. The post amplifier 222 is connected to the discrete photodiode 220. The post amplifier 222 amplifies the small electrical signals produced by the discrete photodiode 220 when optical signals are detected by the discrete photodiode 220. The post amplifier 222 outputs an electrical signal that may be correlated to presence or absence of a thread between the resonant cavity light emitting device 204 and the discrete photodiode 222, and/or the vibration of thread depending on the level of electrical signal output by the post amplifier 222.

While the examples above have been illustrated using a VIP optical device, it should be appreciated that other embodiments may be implemented where discrete optical light emitting devices are used with discreet optical receiving devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method of measuring the speed and vibration of thread in a textile manufacturing system, the method comprising:

emitting an optical signal from a resonant cavity of an optical device, wherein at least a portion of the optical signal is scattered by a moving thread;

receiving at least a portion of the scattered optical signal back into the resonant cavity of the optical device, which causes a change in the optical signal emitted from the resonant cavity of the optical device;

detecting the changed optical signal at a photodiode optically coupled to the optical device; and calculating a lateral movement of the thread based on the detected changed optical signal.

2. The method of claim 1, wherein the optical device and the photodiode are comprised of the same monolithic structure.

3. The method of claim 1, wherein the optical device is a vertical cavity surface emitting laser (VCSEL).

4. The method of claim 1, wherein the optical device is a resonant cavity light emitting diode (RCLED).

5. The method of claim 1, wherein the optical device is a Fabry Perot laser.

6. The method of claim 1, wherein detecting lateral movement of the thread comprises detecting vibrations of the thread.

7. The method of claim 1, wherein detecting lateral movement of the thread comprises detecting a change in amplitude of a self mixing sequence output from the optical device.

8. A system for detecting the speed of thread in a textile manufacturing system, the system comprising
   an optical device configured to emit an optical signal from a resonant cavity;
   a driver coupled to the optical device, the driver configured to drive the optical signal;
   a mechanical guide coupled to the optical device, the mechanical guide configured to receive a moving thread in a textile manufacturing process, wherein the moving thread scatters the optical signal such that a portion of the optical signal is reflected back into the resonant cavity of the optical device; causing a change in the optical signal emitted from the resonant cavity;
   an optical detector optically coupled to the optical device, the optical detector configured to detect the changed optical signal; and
   vibration detection circuitry coupled to the optical detector, wherein the vibration detection circuitry is configured to output a signal representing the lateral movement of the moving thread based on the detected changed optical signal.

9. The system of claim 8, wherein the optical device and the optical detector are comprised of the same monolithic structure.

10. The system of claim 8, wherein the optical device is a vertical cavity surface emitting laser (VCSEL).

11. The system of claim 8, wherein the optical device is a resonant cavity light emitting diode (RCLED).

12. The system of claim 8, wherein the optical device is a Fabry Perot laser.

13. The system of claim 8, further comprising:
    a second optical detector configured to receive optical signals from the optical device; and
    break detection circuitry coupled to the second optical detector, the break detection circuitry configured to output a signal indicating that the thread has broken based on the optical signals received at the second optical detector.

* * * * *